Figure 1:
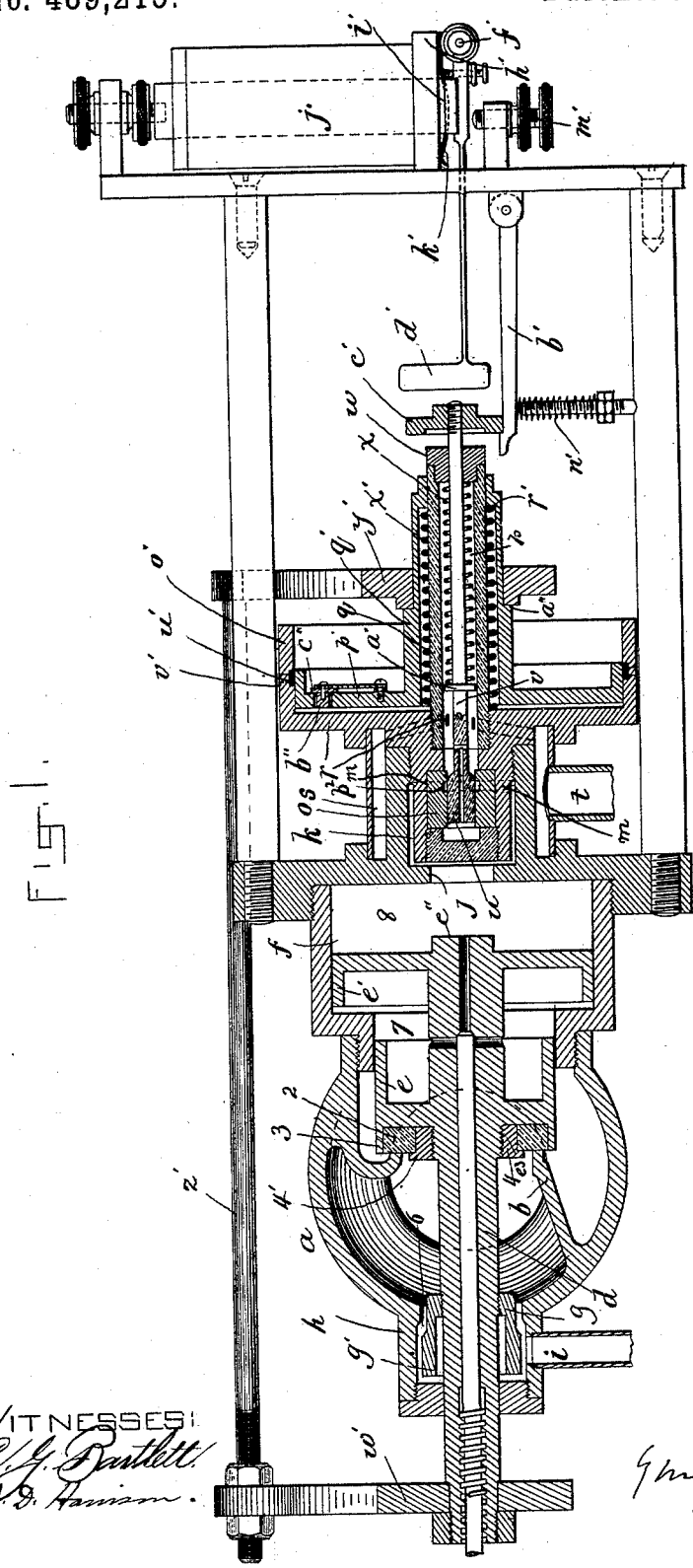

(No Model.)  3 Sheets—Sheet 1.
G. W. BROWN.
VALVE FOR FIRE ALARM WHISTLES.

No. 489,215. Patented Jan. 3, 1893.

WITNESSES:
INVENTOR:

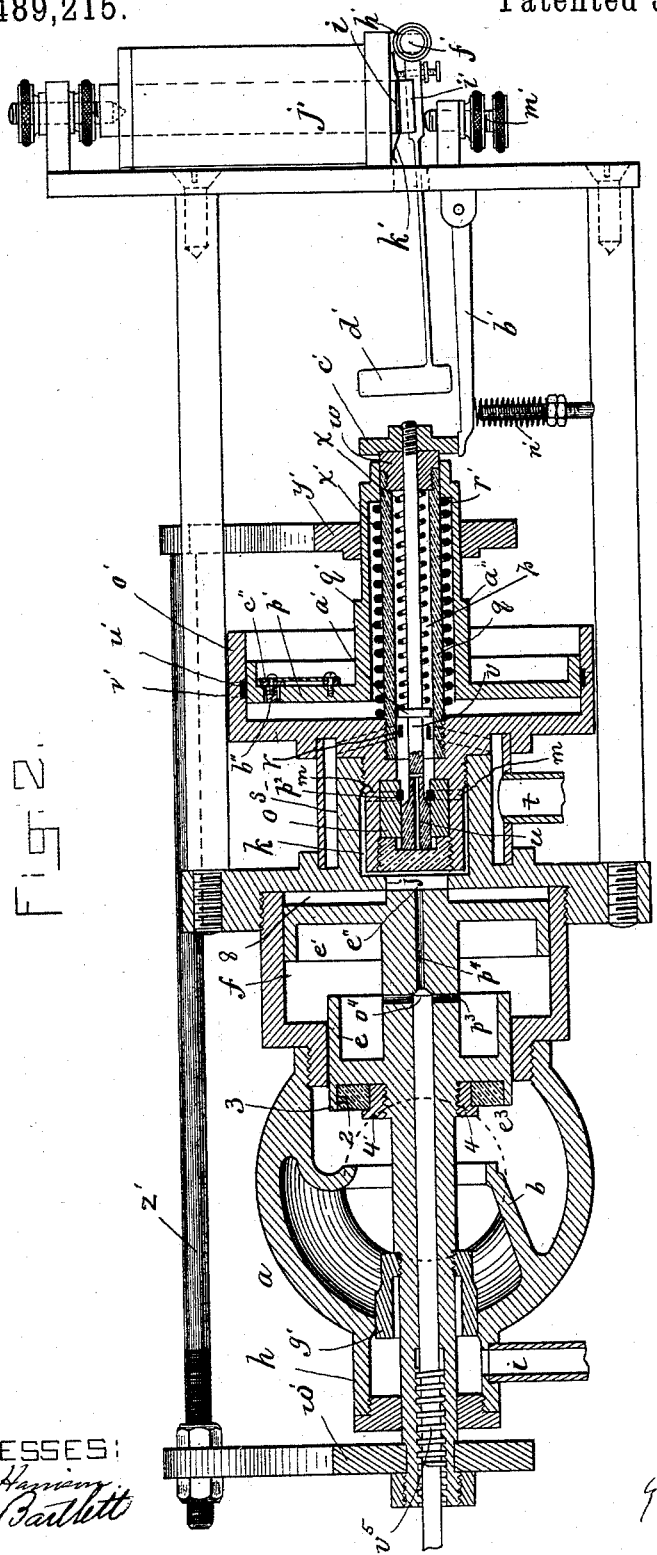

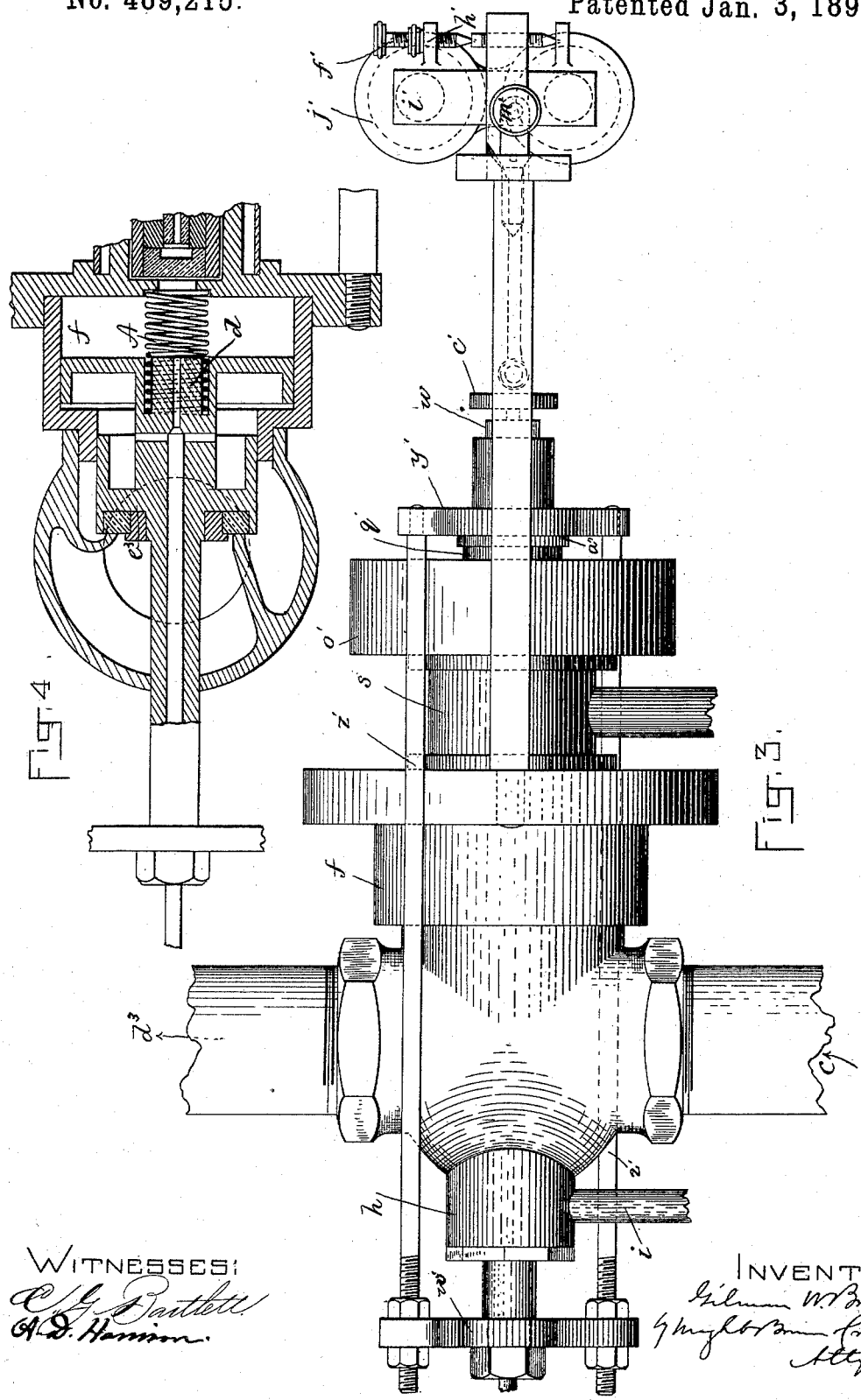

UNITED STATES PATENT OFFICE.

GILMAN W. BROWN, OF WEST NEWBURY, MASSACHUSETTS.

VALVE FOR FIRE-ALARM WHISTLES.

SPECIFICATION forming part of Letters Patent No. 489,215, dated January 3, 1893.

Application filed May 23, 1890. Renewed October 7, 1892. Serial No. 448,094. (No model.)

*To all whom it may concern:*

Be it known that I, GILMAN W. BROWN, of West Newbury, in the county of Essex and State of Massachusetts, have invented certain new and useful Improvements in Valves for Fire-Alarm Whistles, of which the following is a specification.

This invention has for its object to provide a valve for controlling the admission of steam to a fire alarm whistle, in which the power which opens and closes the valve shall be supplied entirely by the steam controlled thereby, and to provide means for controlling said power by the action of an electro magnet adapted to induce the action of the steam in opening and closing the valve.

To this end the invention consists in the several improvements which I will now proceed to describe and claim.

Of the accompanying drawings forming a part of this specification, Figure 1 represents a longitudinal section of my improved whistle valve and the mechanism that induces the action of the steam thereon, the valve being shown closed. Fig. 2 represents a similar view showing the valve opened. Fig. 3 represents a side elevation. Fig. 4 represents a sectional view of a modification.

The same letters of reference indicate the same parts in all the figures.

In the drawings—$a$ represents a valve casing through which steam passes to a whistle, said casing being of the general form used in globe valves and provided with an internal annular seat $b$ and with a receiving end $c$ and a delivering end $d^3$ at opposite sides of said seat see Fig. 3. $e^3$ represents a valve adapted to open and close the opening surrounded by the seat $b$. Said valve is formed on a stem $d$ on which is a piston $e'$ fitted to slide in a chamber or cylinder $f$. The valve $e^3$ is attached to the rod or stem $d$ of the piston and is here shown as composed of a ring 2 of suitable compressible material such as "Jenkins packing" placed within an annular flange 3 formed on the rod $d$ and held by said flange and by a gland 4 screwed upon the valve stem and provided with a lip or flange $4'$ which bears on the outer side of the valve. This construction permits the ready removal of the valve ring 2 and the substitution of a new one for it as will be readily seen.

In Figs. 1 and 2, the valve stem $d$ is extended through the casing $a$ and is provided at the outlet side of the valve seat with another piston $g$ which is of less diameter than the piston $e'$ and is received in a small cylinder or recess $h$, formed on the casing $a$. The piston $g$ is reduced in diameter at its inner end so that when the valve $e^3$ is closed and the said piston is within the cylinder $h$ an annular crevice or space 6 will exist around the piston for the escape of the water of condensation that may accumulate in the valve casing, such water passing off through a waste pipe $i$ attached to the cylinder $h$ for that purpose. The piston $g$ has an enlarged portion $g'$ which when the valve $e^3$ is open as shown in Fig. 2, closely fits the interior of the cylinder $h$ so that steam cannot leak through the cylinder $h$ and waste pipe $i$ when the valve is open and the steam is passing through the casing to the whistle. The piston $e'$ may fit the cylinder $f$ somewhat loosely so that there will be a constant leakage of steam from the inlet end of the casing around the piston $e'$ into the space 8 between the last named piston and the larger end of the cylinder $f$. I prefer to provide a passage $p^3$ $p^4$ in the stem $d$, to permit them to enter the space 8 more rapidly than by leakage around the piston $e'$, when the valve $v^4$ controlling said passage, is opened, said valve being provided with a screw threaded stem $v^5$ engaging an internal thread in the stem $d$, and projecting outside of said stem so that it can be rotated by the operator to open and close the valve $v^4$. The steam that enters said space 8 balances the piston $e'$, the pressure being equal on both sides thereof, so that the valve is kept closed against its seat until an outlet is provided for the steam from the end 8 of the cylinder by the opening of a vent permitting the escape of steam from said cylinder as hereinafter described. When said vent is opened, the valve $v^4$ being closed, the piston $e'$ is no longer balanced, the steam pressure at one side thereof continuing, while the pressure on the opposite side *i. e.*, in the space 8 is relieved. The piston and the valve connected therewith are therefore moved by the steam pressure to the position shown in Fig. 2, the valve being thus opened and held open until the vent from the cylinder $f$ is again closed. When this is done the pressure of the steam accumulates in the space 8, the valve $v^4$ being preferably opened to permit steam to enter said space quickly. The piston $e'$ is thus again balanced, and the steam pressure exerted on the piston $g$ closes the valve, the area presented by the piston $g$ to the steam pressure in the casing $a$ being sufficient to give the valve its closing movement. When the valve is closed the vents being also closed, piston $e'$ is balanced so that the steam has no tendency to open the valve.

The steam may be admitted directly, and without hinderance, from the inlet $c$ of the valve casing to the space 7 in the cylinder at one side of the piston $e'$, but its action would in that case be undesirably abrupt, hence I provide a check in the form of an auxiliary piston $e$, smaller than the piston $e'$ and attached to the rod $d$ between the piston $e'$ and the valve $e^3$. Said piston $e$ fits a reduced portion of the cylinder so loosely that steam can leak around it into the space 7 between the pistons $e$ $e'$, the action of the steam being thus made more gradual in opening the valve than it would be if there were no check to its entrance into said space. I do not confine myself to the employment of the auxiliary piston $e$ however and may dispense entirely with the same without making the apparatus inoperative.

It will be seen from the foregoing that the construction is such that the opening and closing of the valve is primarily caused by the opening and closing of a steam escape passage or vent, an operation that is capable of being performed by a very small expenditure of power, so that the valve is particularly adapted for fire alarm whistles in which it is desirable to employ an electro magnet as the means for controlling the whistle. Any suitable mechanism may be employed for opening and closing said vent and thereby inducing the action of the steam in opening and closing the valve.

I have employed with good results the devices next described although I do not limit myself thereto but may control the vent by any other suitable means. The said vent as here shown comprises an opening $j$ in the larger end of the cylinder, an annular passage $k$ communicating with said opening, radial passages $m$ extending inwardly from said annular passage to the interior of a small cylinder $o$ as shown by dotted lines in Figs. 1 and 2, said passages terminating in an annular groove $p^2$ in said cylinder, a tube or passage $p$ extending from said cylinder, and radial passages $r$ extending from said passage $p$ into a chamber $s$, the lower portion of which communicates with a waste or drip pipe $t$. Fitted to slide in the cylinder $o$ is a cylindrical auxiliary valve $u$ formed on a reduced rod or stem $v$ which extends outwardly through the tube $q$ and through a cap $w$ secured to the outer end of said tube, said valve covering the groove $p^2$ and preventing the passage of steam through the above described escape vent when in the position shown in Fig. 1, and partially uncovering said groove and permitting the escape of steam through said vent when in the position shown in Fig. 2. A spring $x$ interposed between the cap $w$ and a shoulder $a'$ on the rod $v$ normally presses the rod $v$ and valve $u$ toward the open position shown in Fig. 2, when said spring is free to act. Said rod and valve are held however against the pressure of said spring, when the whistle valve $e^3$ is closed, by the engagement of a spring pressed latch $b'$ with a head or collar $c'$ attached to the outer end of the rod $v$. Upon the disengagement of the latch $b'$ from said head the spring $x$ forces the valve $u$ from the position shown in Fig. 1, to that shown in Fig. 2, thus permitting the escape of steam from the cylinder through the vent.

$d'$ represents a hammer, the shank of which is pivoted at $f'$ to a fixed ear or support $h'$ and has attached to it an armature $i'$ which is arranged in operative proximity to the poles of an electro magnet $j'$. Said magnet is included in the electric circuit of a fire alarm system, and when said circuit is closed holds the armature and hammer in the position shown in Fig. 1. When the circuit is broken the armature is released, and the hammer is caused by the force of a spring $k$ to strike the latch $b'$ with sufficient force to disengage it from the valve rod head $c'$ and thereby releases the latter and permits the valve $u$ to be opened by the spring $x$.

An adjustable stop screw $m'$ limits the described movement of the hammer away from the poles of the electro magnet. The shank of the hammer is resilient, so that after the armature is arrested by the stop $m'$ the shank yields to the momentum of the hammer sufficiently to permit the hammer to strike and displace the latch $b'$, and then resumes its normal position thus holding the hammer out of the way of the latch. When the circuit is again closed the hammer is drawn by the electro magnet to the position shown in Fig. 1. The latch is normally held by a spring $n'$ in position to re-engage the head $c'$ when the valve is moved back to the position shown in Fig. 1, in the manner presently described.

$o'$ represents a cylinder open at one end and closed at the other. Said cylinder surrounds the tube $q$ and contains an annular piston $p'$ formed on a tubular rod $q'$, which surrounds and is adapted to slide upon the tube $q$. A spring $x'$ of greater force than the valve opening spring $x$ is arranged in an annular space between the tubular rod $q'$ and the tube $q$ and bears at one end against the closed end of the cylinder $o'$, and at the other end against a shoulder $r'$ on the tubular rod $q'$, said spring being arranged to force the piston $p'$ and its tubular rod in a direction opposite to the direction in which the valve $u$ is moved by the spring $x$. The spring $x'$ acts through the tubular sliding rod $q'$ to force the valve $u$ from its open position back to its closed position, this being accomplished by contact of the outer end of the tubular rod $q'$ with the head $c'$ on the valve stem $v$ when said rod is forced outwardly by the spring $x'$. The periphery of the piston $p'$ bears somewhat closely against the inner surface of the cylinder $o'$ and when the piston is at the inner end of the cylinder as shown in Fig. 1, the outward movement of the tubular rod $q'$ caused by the spring $x'$ is retarded by atmospheric pressure, said movement being regulated by the admission of air into the space between the closed end of the cylinder and the piston. When the piston is at the inner end of the cylinder, air can enter said space only by leakage between the inner surface of the cylinder and the periphery of the piston. The piston therefore moves slowly until the rear edge of its periphery reaches a groove $u'$ communicating with a series of air admitting orifices $v'$ in the cylinder $o'$. Air is then admitted more rapidly so that the remaining outward movement of the piston is not retarded, and the spring $x'$ is enabled to act with sufficient power to push the valve $u$ back to its closed position against the pressure of the spring $x$ when the outer end of the tubular rod $q'$ strikes the head $c'$ on the stem, the spring $x$ being thus compressed or set for its next action.

A connection is provided between the outer end of the stem $d$ of the whistle valve and the tubular piston rod $q'$ whereby when the whistle valve is closed, it moves the piston and its tubular rod $q'$ inwardly, the piston being thus forced to the inner end of the cylinder and caused to cover the air inlets $v'$, and the spring $x'$ is at the same time compressed or set and held ready for its next action, the connection being so engaged with the tubular piston rod $q$ that when the whistle valve is opened it will release said rod and permit the described retarded and accelerated movements of the spring $x'$ and rod $q'$. Said connection is here shown as composed of a cross head $w'$ rigidly attached to the outer end of the whistle valve stem $d$, a cross head $y'$ adapted to slide upon the tubular rod $q'$ of the piston, and rods $z'$ connecting the cross head $w'$ with the cross head $y'$. The cross head $y'$ bears on a shoulder $a'$ on the tubular rod $q'$, and is thus adapted to positively move said rod and its piston inwardly when the whistle valve is being closed, but when the whistle valve is opened, the cross head $y'$ slides outwardly on the tubular rod $q'$ away from said shoulder, leaving the piston and its tubular rod free to be moved slowly outward by the spring $x'$ in the manner above described. The piston $p'$ has an orifice $b''$ and a spring pressed valve $c''$ normally closing said orifice, said valve being arranged to yield when the piston is being moved inwardly by the whistle valve, thus permitting the air to escape from between the piston and the closed end of the cylinder, so that the piston is moved inwardly without resistance.

The operation as a whole is as follows— When the circuit including the electro magnet $j'$ is broken by the operation of an alarm box or other suitable device in the circuit, the hammer $d'$ is released and strikes the latch $b'$ thus releasing the valve $u$. The spring $x$ then forces the valve $u$ to its open position thus opening the steam vent from the cylinder $f$. The whistle valve $e^3$ is then opened as already described by the steam pressure, and remains open until the valve $u$ is closed by the action of the spring $x'$ and tubular rod $q'$, so that the length of the period during which the whistle is sounded, is determined by the duration of the retarded movement of the piston, the valve $u$ being closed at once by the spring $x'$ after the piston has passed the limit of its retarded movement, so that the whistle valve is closed by the steam pressure, the piston $p'$ being at the same time retracted to the position shown in Fig. 1, as already described through its connection with the whistle valve, leaving the head $c'$ of the outlet valve stem $v$ engaged with the latch $b'$ so that there can be no further operation of the whistle until the circuit is again broken.

It will be seen that the improved construction of the whistle valve whereby the same is adapted to be opened by the pressure of the steam which it controls upon the opening of a small steam outlet or vent, and to be closed by pressure from the same source upon the closing of said vent, enables the valve to be readily controlled by an electro magnet, without the necessity of employing a powerful mechanical motor or train of gearing impelled by a weight or spring to control the operation of the valve. It will also be seen that in the vent controlling apparatus here shown, the two springs $x\ x'$ enable the steam while moving the whistle valve to store up the preliminary power required for the next operation, the lighter spring $x$ opening the vent controlling valve when released by the magnet, and being compressed or set for its next action by the heavier spring $x'$, while the said heavier spring is compressed or set for action by the steam pressure which closes the whistle valve, and is released to close the vent and set the lighter spring by the opening of the whistle valve.

To prevent a blow and the battering of parts when the valve $e^3$ is opened, I provide the piston $e'$ with a boss or projection $e''$ and make in the larger end of the cylinder a recess $j$, which closely fits said projection so that when the valve $e^3$ is opened a body of steam will be suddenly confined in the recess $j$ by the projection $e''$ and form a cushion preventing the piston from striking the end of the cylinder.

In Fig. 4 I have shown a spring A arranged to close the valve $e^3$ as a substitute for the piston $g$, said spring being interposed between one end of the cylinder $f$ and the valve rod or stem $d$, and acting on the latter.

I claim:

1. The combination substantially as hereinbefore set forth, of a whistle valve, a piston connected therewith, an auxiliary valve controlling a passage communicating with the cylinder which contains said piston, an electro magnet controlling said auxiliary valve, and a retarding or regulating device which determines the duration of the open position of the auxiliary valve and derives its power from the main valve.

2. The combination substantially as hereinbefore set forth, of a whistle valve, its casing, a piston connected with the valve at the steam inlet side of the casing, a cylinder containing said piston, and provided with a vent, said cylinder being in communication with the steam inlet of the casing, whereby when said vent is closed the piston is balanced, an auxiliary valve which is normally held in position to close the vent, a latch or detent whereby the auxiliary valve is held in position to close the vent, and an electro magnet controlling said latch.

3. The combination of a whistle valve and its casing, a piston connected thereto at the steam receiving side of the casing, a cylinder inclosing said piston and formed to permit leakage of steam around the piston, a vent arranged to permit the escape of steam from the cylinder at one side of the piston, and an auxiliary valve adapted to reduce the steam pressure at one side of the piston by opening the vent, and thereby permit the steam pressure at the opposite side to open the whistle valve, and to balance the said piston by closing the vent so that the valve may be freely closed, as set forth.

4. The combination of a whistle valve and its casing, a piston connected thereto at the steam receiving side of the casing, a cylinder inclosing said piston and formed to permit leakage of steam around the piston, a vent arranged to permit the escape of steam from the cylinder at one side of the piston, and an auxiliary valve adapted to reduce the steam pressure at one side of the piston by opening the vent, and thereby permit the steam pressure at the opposite side to open the whistle valve, and to balance the said piston by closing the vent, and means for closing the whistle valve when said piston is balanced, as set forth.

5. The improved whistle controlling valve composed of a casing having a steam passage surrounded by a valve seat, a cylinder communicating with said casing at the steam receiving side of the valve seat, said cylinder having a vent or steam outlet communicating with one end, a valve adapted to the seat in said casing, and a piston connected with said valve, said piston loosely fitting the cylinder and permitting the leakage of steam from the receiving side of the valve seat, whereby the piston is balanced when the said vent is closed and is cause to receive the valve opening pressure of the steam when the vent is opened, as set forth.

6. The improved whistle controlling valve composed of a casing having a steam passage surrounded by a valve seat, a cylinder communicating with said casing at the steam receiving side of the valve seat, said cylinder having a vent or steam outlet communicating with one of its ends, a valve adapted to the seat in said casing, a piston connected with said valve, and loosely fitting the cylinder, and another piston connected with the valve at the steam outlet side of the valve seat, whereby when the said vent is closed with the valve open and the piston at the steam receiving side is balanced as described, the valve will be closed by the steam pressure on the other piston, as set forth.

7. The improved whistle controlling valve composed of a casing having a steam passage surrounded by a valve seat, a cylinder communicating with said casing at the steam receiving side of the valve seat, said cylinder having sections of different diameters and a vent or steam outlet communicating with its larger end, a valve adapted to the seat in said casing, and two pistons of different diameters connected with said valve, said pistons loosely fitting the sections of the cylinder and permitting the leakage of steam from the receiving side of the valve seat into the space between the two pistons and into the space between the larger piston and the larger end of the cylinder, whereby the larger piston is balanced when the said vent is closed and is caused to receive the valve opening pressure of the steam between the two pistons when the vent is opened, as set forth.

8. The improved whistle controlling valve composed of a casing having a steam passage surrounded by a valve seat, a cylinder communicating with said casing at the steam receiving side of the valve seat, said cylinder having sections of different diameters and a vent or steam outlet communicating with its larger end, a valve adapted to the seat in said casing, two pistons of different diameters connected with said valve, said pistons loosely fitting the sections of the cylinder, and a third piston connected with the valve at the steam outlet side of the valve seat, whereby when the said vent is closed with the valve open and the two pistons at the steam receiving side are balanced as described, the valve will be closed by the steam pressure on the said third piston, as set forth.

9. The valve casing having a steam passage surrounded by a valve seat and a cylindrical recess provided with a waste or drip opening at the outlet side of said valve seat, combined with the valve having on its stem a piston formed to enter said recess, said piston being smaller at its inner than at its outer end, whereby, when the valve is closed, communication is formed around the piston with the waste or drip opening and when the valve is closed said communication is cut off, to prevent waste of steam, as set forth.

10. The combination of a valve casing having an internal valve seat, a valve therein, a cylinder communicating with the valve casing and having a vent at one end thereof, a piston connected with said valve at the steam receiving side of the casing, and loosely fitting the said cylinder, whereby steam is admitted to said cylinder to balance the piston when the valve is closed, a valve closing piston connected with the valve at the outlet side thereof, an auxiliary valve controlling the steam vent or the cylinder, and means for opening and closing said vent valve, as set forth.

11. The combination of a valve casing having an internal valve seat, a valve therein, a cylinder communicating with the valve casing and having a vent at one end thereof, a piston connected with said valve at the steam receiving side of the casing, and loosely fitting the said cylinder, whereby steam is admitted to said cylinder to balance the piston when the valve is closed, a valve closing piston connected with the valve at the outlet side thereof, an auxiliary valve controlling the steam vent of the cylinder, a spring arranged to normally open the vent valve, a stronger spring arranged to close the vent valve and compress the spring thereof, a latch which automatically holds the vent valve in its closed position, and a connection between the said stronger spring and the whistle valve, whereby said spring is compressed or set for action by the closing of the whistle valve and released and permitted to act on the vent valve by the opening of the whistle valve, as set forth.

12. The combination with the whistle valve, its casing, the cylinder connected therewith and provided with a vent, and the piston connected with the valve, of the vent valve, a spring arranged to normally open the vent valve, a stronger spring adapted to close said vent valve and compress the spring thereof, a latch which locks the vent valve in its closed position, a connection between said stronger spring and the whistle valve, whereby the spring is compressed or set for action by the closing of the whistle valve, and released by the opening of the whistle, and a retarding device whereby the movement of the stronger spring is retarded prior to its vent valve closing action, as set forth.

13. The combination with the whistle valve, its casing, the cylinder connected therewith and provided with a vent, and the piston connected with the valve, of the vent valve, a stem attached to said valve and provided with a head at its outer end, a spring $x$ adapted to normally open the vent valve, a tubular rod arranged to slide on a fixed support surrounding the stem of the vent valve, a spring $x'$ of greater strength than the spring $x$ arranged to move the tubular rod outwardly and thereby cause its outer end to strike the head of the vent valve stem and close the vent valve, a latch which holds the vent valve in its closed position, and a retarding device which retards a portion of the movement of the tubular rod by the spring $x'$, said retarding device comprising a fixed cylinder open at one end and provided with air inlets between its closed and its open ends, a piston affixed to the tubular rod and fitting said piston, as set forth.

14. The combination with the whistle valve, its casing, the cylinder connected therewith and provided with a vent, and the piston connected with the valve, of the vent valve, a spring arranged to normally open the vent valve, a stronger spring adapted to close said vent valve and compress the spring thereof, a latch which locks the vent valve in its closed position, a connection between said stronger spring and the whistle valve, whereby the spring is compressed or set for action by the closing of the whistle valve, and released by the opening of the whistle, a retarding device whereby the movement of the stronger spring is retarded prior to its vent valve closing action, and an electrically controlled hammer arranged to displace the vent valve holding latch, as set forth.

15. The combination with the vent valve rod or stem having the head $c'$, of the spring latch adapted to automatically engage said head, a hammer arranged to displace said latch, an armature attached to the shank of said hammer, and an electro magnet arranged to hold said armature with the hammer in a raised or retracted position, as set forth.

In testimony whereof I have signed my name to this specification, in the presence of two subscribing witnesses, this 13th day of May, A. D. 1890.

GILMAN W. BROWN.

Witnesses:
C. F. BROWN,
A. D. HARRISON.